(12) United States Patent
Fukuzawa et al.

(10) Patent No.: US 6,658,708 B2
(45) Date of Patent: Dec. 9, 2003

(54) TENTER APPARATUS

(75) Inventors: Kiyoshi Fukuzawa, Kanagawa (JP); Toshio Higashikawa, Shiga (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/345,405

(22) Filed: Jan. 16, 2003

(65) Prior Publication Data

US 2003/0159259 A1 Aug. 28, 2003

(51) Int. Cl.⁷ .............................. D06C 3/02; B29C 55/08
(52) U.S. Cl. ..................................... 26/91; 26/93; 26/74
(58) Field of Search ......................... 26/91, 93, 74, 26/76, 72, 96, 89, 88, 75, 51, 51.3, 51.4; 264/288.4, 290.2, 291, 40.1; 425/66, 135, 145

(56) References Cited

U.S. PATENT DOCUMENTS

| | | | | |
|---|---|---|---|---|
| 3,490,094 A | * | 1/1970 | Pfeffer, Jr. ..................... | 26/91 |
| 3,571,846 A | * | 3/1971 | Tomlinson ...................... | 26/91 |
| 4,497,096 A | * | 2/1985 | Richter ........................... | 26/74 |
| 4,559,680 A | * | 12/1985 | Gresens ......................... | 26/74 |
| 4,815,181 A | * | 3/1989 | Dornier et al. ................. | 26/91 |
| 5,255,419 A | * | 10/1993 | Stanislaw et al. .............. | 26/91 |
| 6,038,750 A | * | 3/2000 | Pabst ............................. | 26/76 |

FOREIGN PATENT DOCUMENTS

| | | |
|---|---|---|
| JP | 50-83482 A | 7/1975 |
| JP | 2-113920 A | 4/1990 |

* cited by examiner

*Primary Examiner*—Amy B. Vanatta
(74) *Attorney, Agent, or Firm*—Sughrue Mion, PLLC

(57) ABSTRACT

A right rail and a left rail are constituted of an entrance rail portion, an exit rail portion, and a rail connecting portion. The respective portions of the rails are moved in a film-width direction via a rail attachment and a positioning section. The positioning section is constituted of a lead screw rod and a positioning motor. The respective positioning motors are controlled by a controller. Upon inputting an entrance width and an exit width through a data input section, the controller moves positions of the respective rail attachments and performs orientation so as to decline an orientation axis.

8 Claims, 2 Drawing Sheets

TENTER APPARATUS

BACKGROUND OF THE INVENTION

1. Field of the Invention

The present invention relates to a tenter apparatus, and particularly to a tenter apparatus for producing a sheet-form material of a film and so forth, in which an orientation axis inclines relative to a lateral side by an angle of 10° or more and 80° or less.

2. Description of the Related Art

Conventionally, when a tenter apparatus produces a sheet-form material of a film and so forth in which an orientation axis is declined, for example, by 45° relative to a lateral side, orienting is merely performed at a routinely-fixed orienting magnification which is theoretically calculated in advance, such as described in Japanese Patent Publication Nos. 50-83482 and 2-113920.

Since orienting can not be performed at any orienting magnification except the fixed orienting magnification, it is difficult to obtain a sheet-form material of a film and so forth inclining at 45° or thereabout, for example, which is aimed at an optional orienting magnification. Thus, there arises a problem in that a yield rate for cut products is not improved. Further, since oblique films having a fixed orienting magnification and a fixed width are merely produced, there arises a problem in that general-purpose properties are poor.

SUMMARY OF THE INVENTION

In view of the foregoing, it is a primary object of the present invention to provide a tenter apparatus in which a sheet-form material of a film and so forth having an orientation axis declined relative to a lateral side by an angle of 10° or more and 80° or less is produced at an optional orienting magnification and in an optional width.

In order to achieve the above and other objects, in the tenter apparatus according to the present invention, preheating is performed while side edges of a sheet-form material are held and moved by film grips running along a left tenter rail and a right tenter rail at a same speed. After preheating, orientation is carried out in a width direction. The right and left tenter rails are constituted of an entrance rail portion, an exit rail portion, and a rail connecting portion. These rail portions and the rail connecting portions are provided with positioning members which are used for changing a width and are independent regarding the right and left sides. In accordance with an orienting magnification optionally set, the respective positioning members are controlled to adjust a distance between right and left rail bending portions. In virtue of this, under the optional orienting magnification, an orientation axis is adapted to incline at an angle of 45°±5° relative to a side edge of a film. Incidentally, it is preferable that the positioning member is constituted of a lead screw for changing the width, a positioning motor for rotating the lead screw, and a female screw region meshing with the lead screw and attached to each of the rail portions and the rail connecting portions. It is preferable that the positioning motor is controlled on the basis of an operation expression programmed in advance.

According to the present invention, it is possible to improve a degree of freely moving the respective rails. The sheet-form material of a film and so forth, in which the orientation axis is declined relative to the side edge by an angle of 10° or more and 80° or less, may be produced at any orienting magnification so as to have any width in a loss-reducing state. Further, various changes of rail patterns may be easily performed in a short time.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
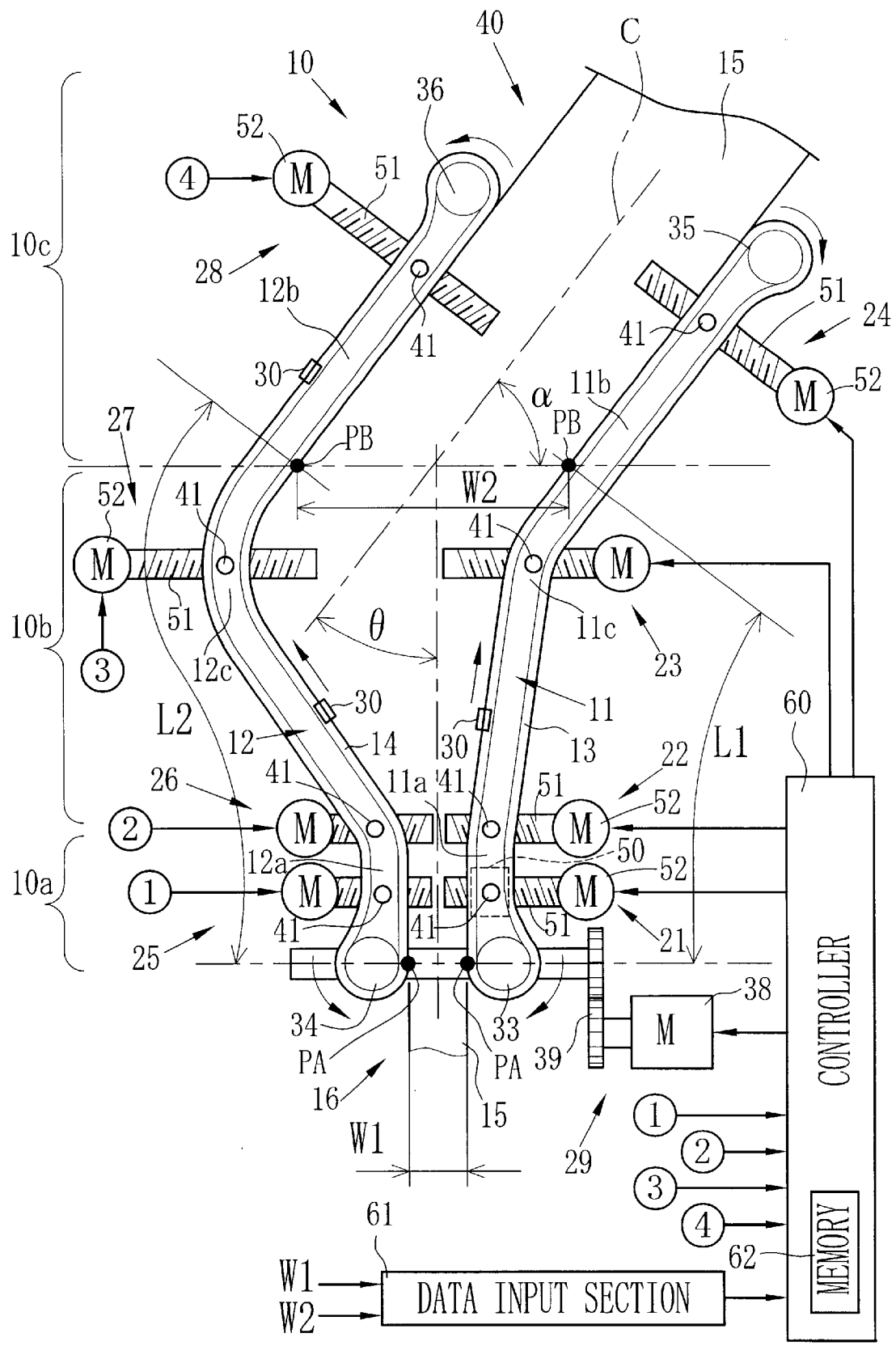
FIG. 1 is a plan view including function blocks and schematically showing a tenter apparatus according to the present invention.

FIG. 1 is a plan view schematically showing a tenter apparatus according to the present invention. The tenter apparatus 10 is constituted of a right rail 11, a left rail 12, endless chains 13 and 14 guided by the rails 11 and 12, positioning sections 21 to 28, and a chain driver 29. The tenter apparatus 10 is partitioned into a few areas of a preheating section 10a, an orienting section 10b, and a thermal-processing section 10c, which are arranged in this order from an entrance 16 of a film 15.

As well known, a large number of film grips 30 are attached to the endless chains 13 and 14 at predetermined intervals. The film grip 30 holds a side edge of the film 15, and in this state, the film grip 30 moves along each of the rails 11 and 12 to orient the film 15.

The endless chain 13 is laid between a driving sprocket 33 and a driven sprocket 35, and the endless chain 14 is laid between a driving sprocket 34 and a driven sprocket 36. The endless chain 13 is guided by the right rail 11 between the sprockets 33 and 35, and the endless chain 14 is guided by the left rail 12 between the sprockets 34 and 36. The driving sprockets 33 and 34 are disposed at a side of the entrance 16 of the film 15, and are rotated by a motor 38 and a gear train 39. Meanwhile, the driven sprockets 35 and 36 are disposed at a side of an exit 40 of the film 15.

The right rail 11 is constituted of an entrance rail portion 11a, an exit rail portion 11b, and a rail connecting portion 11c. Similarly, the left rail 12 is constituted of an entrance rail portion 12a, an exit rail portion 12b, and a rail connecting portion 12c. The respective rail portions 11a to 11c and 12a to 12c are joined to the positioning sections 21 to 28 respectively by rail attachments 41. The positioning sections 21 to 28 move the respective rail attachments 41 in a film-width direction to change distances in a width direction of the right-and-left rails and the rail connecting portions.

The positioning section 21 is constituted of an attachment block 50 having a female screw region, a lead screw rod 51 meshing with the female screw region, and a positioning motor 52 for rotating the lead screw rod 51. Thee positioning motor 52 is controlled by a controller 60 via a driver. Incidentally, similarly to the positioning section 21, the other positioning sections 22 to 28 are constituted so as to include the attachment block (not shown), the lead screw rod 51 and the positioning motor 52.

The controller 60 is provided with a data input section 61 of a keyboard or the like so as to be capable of inputting setting values concerning a tenter entrance width W1 and an exit width W2 Meanwhile, an operation expression for an orienting pattern is programmed beforehand in the controller 60 and is stored in the memory 62. Upon inputting the setting values of the tenter entrance width and the exit width, the controller 60 calculates a peripheral length and a position of each chain from the operation expression in accordance with the setting values. And then, the controller drives the respective positioning motors 52 and moves the respective rail attachments 41 in the film-width direction so as to take the calculated position.

In other words, the positioning motors 52 are automatically driven to change an open angle of the right and left rails 11 and 12, and to change rail-portion lengths of the rail connecting portions 11c and 12c. Owing to this, lengths L1 and L2 between an entrance chuck position PA and an entrance position PB of the thermal-processing section 10c are changed to set a rail pattern of which αis 45°±5°. It is possible without regard to the orienting magnification to obtain an oblique film in which αis equal to 45°±5°.

Next, an operation of the present embodiment is described below. First of all, the tenter entrance width W1 and the exit width W2 are inputted from the data input section 61 of the keyboard and so forth. Upon inputting the data, the controller 60 determines the locations of the respective positioning sections 21 to 28 by using the operation expression. Successively, the controller rotates the positioning motors 52 of the respective positioning sections 21 to 28 so as to take the above locations. After that, the film 15 produced in a film making line or the like is forwarded into the tenter apparatus 10 through the film entrance 16 where the film grip 30 is set in an open state. When both side edges of the forwarded film 15 enter the film grips 30, the film grips 30 are closed to hold the film 15. The film grips 30 move along the rails 11 and 12 in accordance with rotations of the respective chains 13 and 14. In virtue of this, the film 15 is oriented to produce the film 15 of which orientation axis is declined at the angle of 45°±5° relative to the side edge. In this way, the oblique film is easily produced in a condition that the angle of the orientation axis is set to 45°±5° in accordance with the orienting magnification (W1/W2).

When the orientation is performed with the tenter apparatus 10 of the present invention, the film 15 may be utilized as a polarizing film having excellent polarizing ability. By providing a protective film, via an adhesive layer, on both surfaces or either surface of the film 15 obtained as the polarizing film, a polarizing plate is obtained. According to the present invention, the orientation-axis angle a of the film 15 is optionally set within a range of 10° or more and 80° or less, so that there is a great advantage when used together with the other optical members. The obtained polarizing plate has excellent single-plate transmittance and degree of polarized light. Thus, contrast of an image may be improved when the polarizing plate is used as a liquid crystal display device. This is very advantageous.

When the polarizing plate is produced, it is preferable to dye a film to be oriented with aqueous solution including a polarizer of iodine potassium iodide and so forth prior to an orienting process performed by the tenter apparatus of the present invention. The film is, for example, polyvinyl alcohol used as the polarizing film. After that, the orienting process is performed. It is preferable to paste the protective layer after the orienting process or at a final stage thereof.

The orientation performed by using the tenter apparatus 10 according to the present invention is advantageous not to a polymer film particularly limited but to a film which is a subject to be oriented for forming a polarizing film and comprises proper thermoplastic polymer. As examples of the polymer, there are polyvinyl alcohol, polycarbonate, cellulose acrylate, polysulfone and so forth. Preferable one is polyvinyl-alcohol-based polymer including polyvinyl alcohol.

Figure 2:
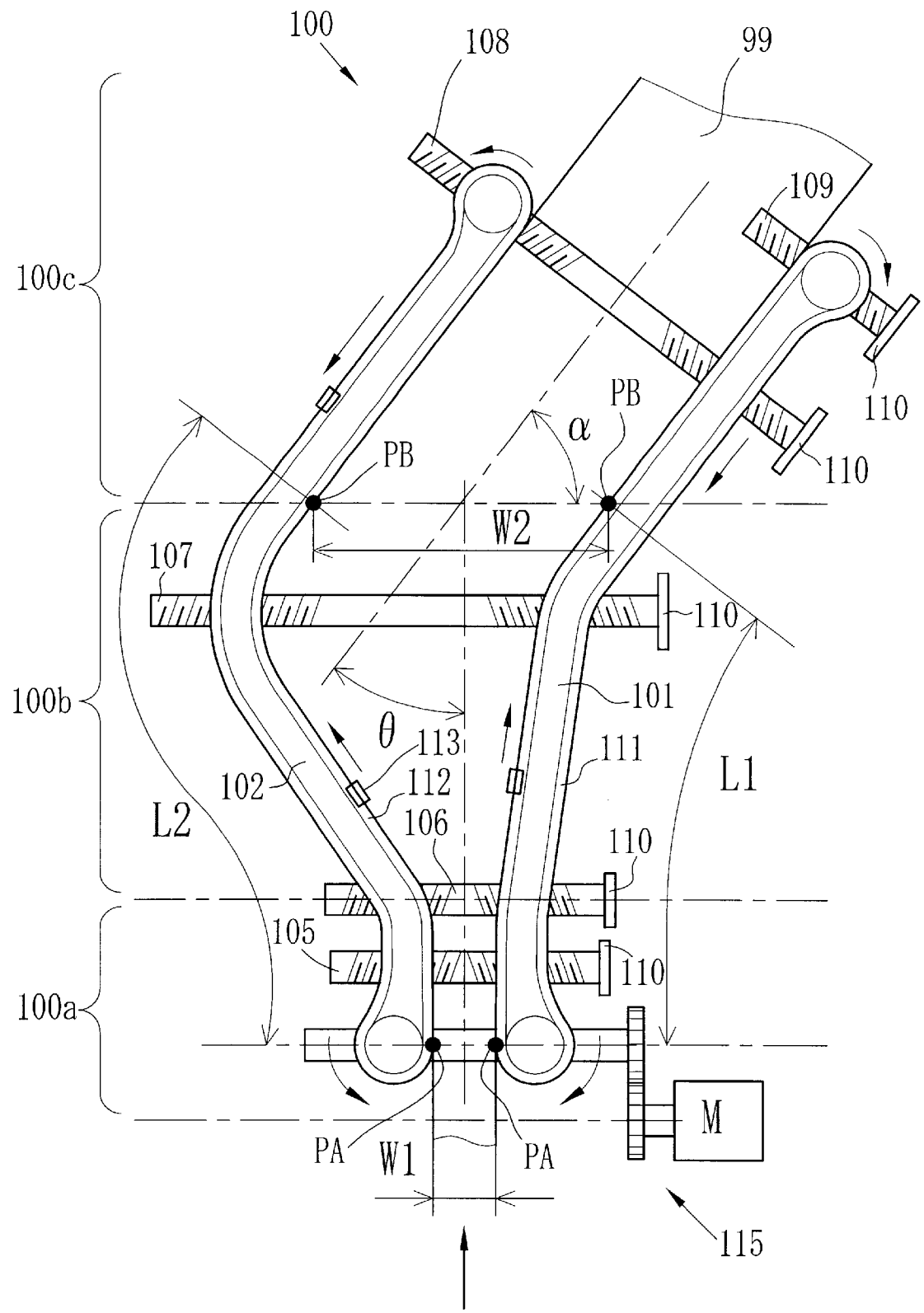
FIG. 2 is a plan view schematically showing a conventional tenter apparatus.

FIG. 2 shows a conventional tenter apparatus 100 being as a comparative example. In the tenter apparatus 100, each of right and left rails 101 and 102 are moved by lead screw rods 105 to 109. Among the lead screw rods 105 to 109, three screw rods 105 to 107 are formed with double-end screw to move both of the rails 101 and 102 by one of the lead screw rods 105 to 107. Incidentally, reference numerals 111 and 112 denote endless chains, 113 denotes a film grip, and 115 denotes a chain driver. Furthermore, 100a denotes a preheating section, 100b denotes an orienting section, and 100c denotes a thermal processing section.

In the conventional tenter apparatus 100, the respective rails 101 and 102 have a small radius of movement and are merely moved by a same amount in right and left directions. Thus, a film 99 is merely oriented at a limited orienting magnification in accordance with a predetermined rail pattern. Meanwhile, a distance between the right and left rails 101 and 102 is adjusted by manually rotating each of the lead screw rods 105 to 109 with a handle 110. Thus, it takes a lot of time and labor to carry out positioning of the rail pattern wherein αis 45°±5°. In other words, time and labor are taken because the rail pattern is determined, seeking chain circular lengths R1 and R2 and chain lengths L1 and L2, which are from an entrance position PA to an entrance position PB of the thermal-processing section 100c, in a condition that L1 and L2 are adapted to be constant and αis adapted to be 45°±5°. Moreover, it is impossible to make an adjustment to 45°±5° at any orienting magnification except the above-mentioned orienting magnification, and the orienting pattern in which a is 45°±5° is obtained only at the limited magnification.

By contrast, in the present embodiment, it is possible to freely set the positions of the respective rail portions and the rail connecting portions so that a degree of free setting is improved. Thus, when the entrance width and the exit width are optionally set, the orienting magnification is determined in accordance therewith. In addition, it is possible to easily set the rail pattern wherein a is 45°±5°. Further, the oblique film of which a is equal to 45°±5° is obtained regardless of the orienting magnification. Incidentally, an angle θof a line C relative to the apparatus is not exclusive to 45°±5°, but may be within an angle range of 10° or more and 80° or less.

In the foregoing embodiment, the positioning sections 21 to 28 are constructed by using the lead screw rod 51 and the female screw region. However, the respective rail portions and the rail connecting portions may be constructed so as to be capable of independently changing their positions. The above structure is not exclusive.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A tenter apparatus in which a sheet-form material is preheated while moved, and said sheet-form material is oriented in a width direction thereof after preheating, said tenter apparatus comprising:
   a left film grip for holding a left-side edge of said sheet-form material;
   a right film grip for holding a right-side edge of said sheet-form material, said right and left film grips moving at a same speed;

a left tenter rail along which said left film grip runs, said left tenter rail being constituted of a left entrance rail portion, a left exit rail portion, and a left rail connecting portion combining these rail portions;

a right tenter rail along which said right film grip runs, said right tenter rail being constituted of a right entrance rail portion, a right exit rail portion, and a right rail connecting portion combining these rail portions;

positioning means for changing a width between said right and left tenter rails, said positioning means being independently provided on the respective rail portions and the respective rail connecting portions; and a controller for controlling said positioning means in accordance with an orienting magnification optionally set, said controller adjusting a distance between said right and left tenter rails so that an orientation axis inclines at an angle of 10° or more and 80° or less relative to a side edge of said sheet-form material.

2. A tenter apparatus according to claim 1, wherein said positioning means comprises:

a lead screw for changing said width;

a female screw region meshing with said lead screw and attached to each of the rail portions and the rail connecting portions; and a positioning motor for rotating said lead screw, said positioning motor being controlled on the basis of an operation expression programmed in advance.

3. A tenter apparatus according to claim 2, further comprising:

a left endless chain guided by said left tenter rail, said left film grip being attached to said left endless chain; and a right endless chain guided by said right tenter rail, said right film grip being attached to said right endless chain.

4. A tenter apparatus according to claim 3, wherein said right and left endless chains are respectively laid between la driving sprocket and a driven sprocket, said driving sprocket being disposed at an entrance side of said sheet-form material and said driven sprocket being disposed at an exit side of said sheet-form material.

5. A tenter apparatus according to claim 4, wherein said driving sprocket is rotated by driving means comprising:

a drive motor controlled by said controller; and a gear train for transmitting a rotation of said drive motor to said driving sprocket.

6. A tenter apparatus according to claim 2, wherein said controller includes a memory in which said operation expression is programmed.

7. A tenter apparatus according to claim 6, further comprising:

a data input section connected to said controller and for inputting said orienting magnification.

8. A tenter apparatus according to claim 7, wherein an entrance width of said right and left tenter rails and an exit width thereof are inputted to said data input section.

* * * * *

UNITED STATES PATENT AND TRADEMARK OFFICE
CERTIFICATE OF CORRECTION

PATENT NO. : 6,658,708 B2
DATED : December 9, 2003
INVENTOR(S) : Kiyoshi Fukuzawa and Toshio Higashikawa It is certified that error appears in the above-identified patent and that said Letters Patent is hereby corrected as shown below:

<u>Title page</u>,
Item [30], should read

[30]    Foreign Application Priority Data

January 16, 2002    (JP)    2002-008021 --

Signed and Sealed this

Twentieth Day of April, 2004

JON W. DUDAS
*Acting Director of the United States Patent and Trademark Office*